Aug. 24, 1965   L. I. ZIRIN   3,201,938
RECUPERATIVE ARRANGEMENT FOR GAS TUBINE ENGINES
Filed June 27, 1963
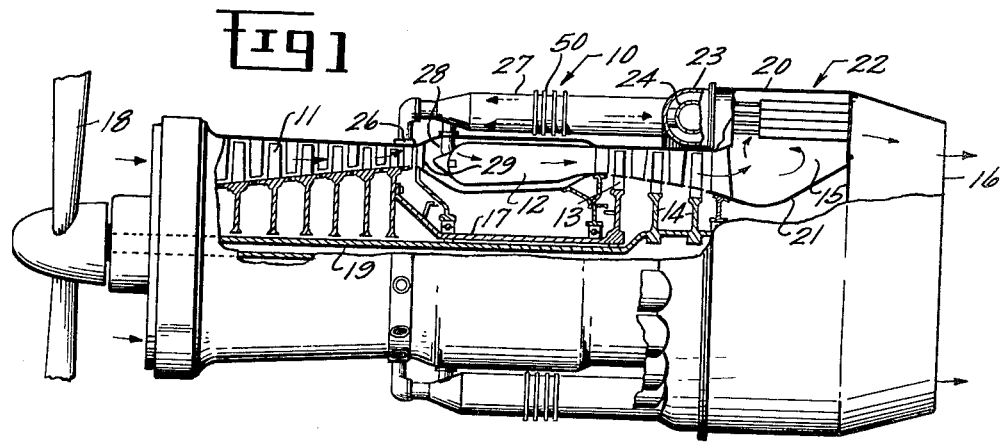
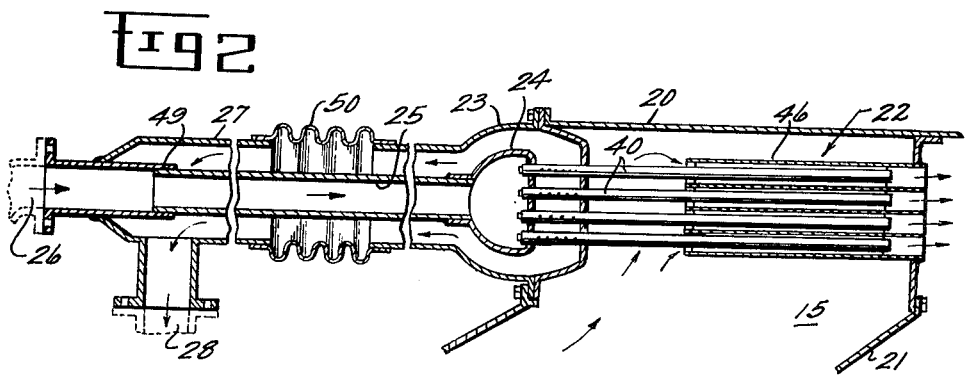
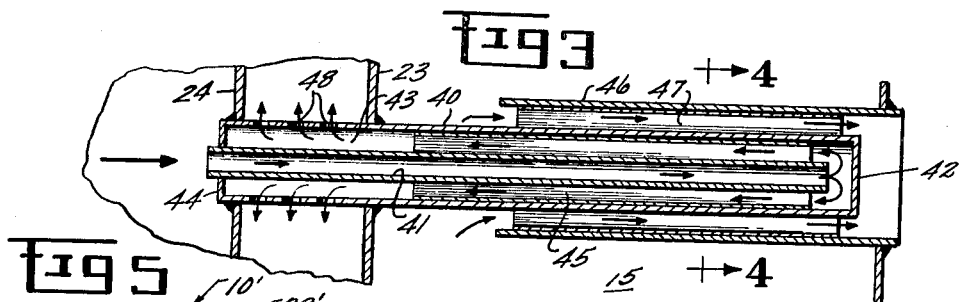
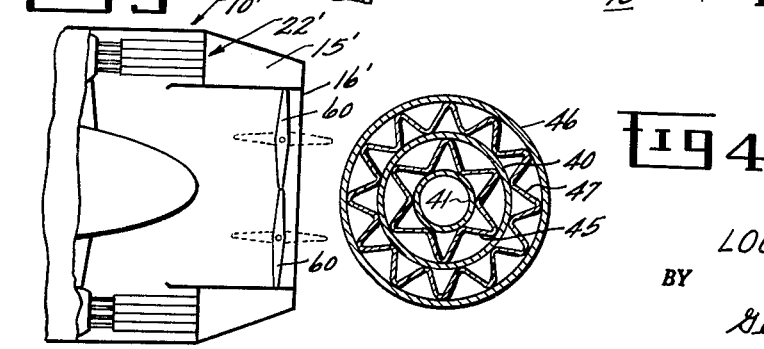
INVENTOR.
LOUIS I. ZIRIN
BY
George R. Powers
ATTORNEY—

United States Patent Office  3,201,938
Patented Aug. 24, 1965

3,201,938
RECUPERATIVE ARRANGEMENT FOR GAS TURBINE ENGINES
Louis Isadore Zirin, Marblehead, Mass., assignor to General Electric Company, a corporation of New York
Filed June 27, 1963, Ser. No. 291,150
6 Claims. (Cl. 60—39.51)

This invention relates to a recuperative arrangement for gas turbine engines and, more particularly, to a structural arrangement for a recuperator which is relatively lightweight and substantially free of thermal stresses.

It has been proposed in the past that a gas turbine powerplant be provided with a recuperator in order to increase the thermal efficiency and thereby reduce fuel consumption. A recuperator is a heat exchanger through which high temperature low pressure exhaust fluid from the turbine is directed prior to being discharged from the powerplant. In the recuperator, the exhaust fluid is passed in heat exchange relationship with high pressure low temperature compressor discharge fluid which is directed through the recuperator prior to being supplied to the powerplant combustor. As a result of the heat exchange, the compressed fluid is heated and supplied to the combustor at a high temperature, and the exhaust fluid is cooled. Although the energy of the exhaust fluid is thus reduced, the net effect of the process is to increase the overall thermal efficiency of the powerplant since less fuel is required to produce a given turbine inlet temperature.

Thermal efficiency is not, however, the only factor which must be taken into consideration by designers of gas turbine powerplants. For example, in an aircraft gas turbine, it is essential that the engine parts be lightweight, even at the sacrifice of some thermal efficiency. Prior art recuperators have tended, in general, to add substantially to the weight of the powerplant. The reason for this is that the elements of the recuperator and its associated structure must be capable of containing the high pressure compressed fluid. A common way of assuring this capability is to use strong, but heavy, elements in the recuperator, the result being a heavy recuperator. In aircraft applications, it has been found that the power required to propel the added weight of prior art recuperators can more than offset the savings in thermal efficiency.

In addition to the weight consideration, leakage of the compressed fluid into the exhaust fluid in the recuperator can be a problem in view of the substantial pressure difference between the two fluids. In the event that such leakage occurs, there is a complete loss to the system of the energy consumed in compressing that portion of the compressor discharge fluid which is lost through leakage. It will thus be obvious that a significant amount of leakage can eliminate the increased thermal efficiency which would otherwise be obtained by use of the recuperator. To prevent leakage, the practice has been to construct recuperators with fluid tight joints. These joints are usually rigid and consequently prevent normal thermal expansion and contraction of the recuperator elements in response to temperature changes. With thermal expansion and contraction thus restrained, the elements of the recuperator are subjected to undesirable thermal stresses. In time, these stresses can cause damage to, or even failure of, the recuperator. For example, the thermal stresses may eventually cause fatigue and cracking of the elements, the resulting leakage decreasing substantially the thermal efficiency of the powerplant.

It is therefore a primary object of this invention to provide an improved recuperative arrangement for gas turbine powerplants which is relatively lightweight and substantially free of thermal stresses.

It is another object of this invention to provide a recuperative arrangement which has low leakage without having substantial thermal stresses.

A further object of this invention is to provide a recuperative arrangement which is simple in design and relatively easy and inexpensive to manufacture.

Briefly stated, in accordance with an illustrated embodiment of the invention, a gas turbine powerplant is provided with a heat exchanger, or recuperator, in the passageway connecting the turbine to the powerplant discharge opening. In the recuperator, the exhaust fluid from the turbine is passed in heat exchange relationship with compressed fluid ducted from the discharge portion of the powerplant compressor. From the recuperator, the heated compressed fluid is directed to the inlet portion of the powerplant combustor. More particularly, the recuperator connects first and second headers in fluid flow relation, one of the headers being enveloped by the other header. First and second ducting means are connected to the first and second headers, respectively. As in the case of the headers, one of the ducting means is enveloped by and coaxial with the other ducting means. One of the ducting means is connected to the discharge portion of the compressor and the other ducting means is connected to the inlet portion of the combustor. Since there is little pressure drop within the recuperator, the pressure is substantially the same within the inner and outer headers and the inner and outer ducting means. As a result, the inner header and the inner ducting means need not be of particularly strong construction. Also in view of the very slight pressure difference across the inner elements, expansion joints may be provided in the inner ducting means without risk of excessive leakage.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a view, partially in section, of a gas turbine powerplant incorporating the recuperative arrangement of this invention; and FIG. 2 is a sectional view of the recuperative portion of the gas turbine powerplant illustrated by FIG. 1; and FIG. 3 is an enlarged view of one of the heat exchange members comprising the recuperator; and FIG. 4 is a view taken along line 4—4 of FIG. 3; and FIG. 5 is a view similar to FIG. 1 of a portion of a gas turbine powerplant having a bypass arrangement for selectively bypassing the recuperator of this invention.

Referring now to the drawing, and particularly to FIG. 1, a gas turbine powerplant indicated generally by numeral 10 is illustrated. The powerplant 10 includes in axially spaced relation an axial flow compressor 11, a combustor 12, a gas generator turbine 13, a power turbine 14, an exhaust passageway 15, and a discharge opening 16. The gas generator turbine 13 provides the power through a shaft 17 to drive the compressor 11. A propeller 18 is driven by the power turbine 14 through a shaft 19 coaxial with the shaft 17.

The exhaust passageway 15 connecting the power turbine 14 and the discharge opening or nozzle 16 is defined between an outer casing 20 and an inner exhaust casing 21. The exhaust fluid flowing through the passageway 15 is directed over the outer surfaces of a large number of axially extending heat exchange members 22, the flow path of the exhaust fluid being shown by the arrows in FIGS. 1 and 2. Each of the heat exchange members 22 is connected to a header arrangement comprised of an outer annular header 23 encircling the powerplant 10 and an inner annular header 24 enveloped by the outer header 23. A plurality of tubular conduits 25 connect the discharge portion 26 of the compressor 11 to the inner header 24, and a plurality of tubular conduits 27 connect the inlet portion 28 of the combustor 12 to the outer header 23. Each of the conduits 25 is enveloped by and is coaxial with a corresponding one of the conduits 27 as best shown by FIG. 2. Annular wall means 29 as illustrated by FIG. 1 are located in the passageway connecting the discharge portion 26 of the compressor 11 to the inlet portion 28 of the combustor 12 to block the passageway and prevent flow of compressor discharge fluid directly to the combustor 12. The wall means 29 thus forces the entire flow of compressor discharge fluid into the conduits 25 and through the heat exchange members 22 which comprise the recuperator.

A preferred embodiment of the heat exchange members 22 is illustrated by FIGS. 2-4, the details of construction being shown by FIGS. 3 and 4. As shown, each member 22 includes an elongated cylinder 40 having a coaxial tube 41 mounted therein. The downstream end of the cylinder 40 is closed by a cover 42, and the tube 41 terminates at its downstream end just short of the cover 42 such that a fluid passageway is provided between the interior of the tube 41 and the space 43 between the tube 41 and the cylindner 40. The upstream end of the tube 41 extends through a plate 44 on the upstream end of the cylinder 40 into the interior of the inner annular header 24. As best shown by FIG. 4, the tube 41 is slidably mounted within the cylinder 40 by a finned structure 45 which allows relative axial movement between the two elements. The cylinder 40 may be slidably mounted if desired within an open ended cylinder 46 through which the exhaust fluid is directed. A finned structure 47 supports the cylinder 40 and permits relative axial movement between the cylinders 40 and 46. The upstream end of the cylinder 40 is secured to both the outer annular header 23 and the inner annular header 24 by suitable means such as the welds shown by FIG. 3, and orifices 48 connect the interior of the outer header 23 and the space 43 in fluid flow relation.

The operation of the recuperator will now be described. High pressure compressed fluid from the discharge portion 26 of the compressor 11 is directed through conduits 25 to the inner annular header 24, from which the fluid enters the tubes 41 and flows through the heat exchange member 22 as shown by the arrows in FIG. 3. The compressed fluid is heated as it flows through the tube 41 and the closed cylinder 40 by the exhaust fluid flowing over the outer surface of the cylinder 40. The heated fluid is discharged from the space 43 through the orifices 48 into the interior of the outer header 23, from which it flows through the conduits 27 to the inlet portion 28 of the combustor 12. The cooled exhaust fluid is discharged from the powerplant 10 through the discharge nozzle 16.

It will be obvious to those skilled in the art that the compressed fluid in the conduits 25 is at approximately the same pressure as the heated fluid in the conduits 27. As a result, the conduits 25 can be of relatively lightweight construction having strength sufficient to withstand the pressure difference between the fluid in the coaxial conduits. Similarly, in view of the small pressure difference between the inner and outer surfaces of the conduits 25, slip joints 49 may be provided in the conduits 25 to permit thermal expansion and contraction in response to temperature changes during machine operation. The conduits 25 are thus substantially free of thermal stresses. The conduits 27 must be substantially heavier than the conduits 25 since the outer surfaces of the conduits 27 are exposed to relatively low pressure ambient conditions. If desired, fluid tight accordion type expansion joints 50 may be provided in the conduits 27. The expansion joints 50 must be strong enough, however, to contain the high pressure compressed fluid.

As in the case of the tubular conduits 25, the inner annular header 24 has substantially the same pressure acting on its inner and outer surfaces. As a result, the inner header 24 can be of relatively lightweight construction. The outer header 23 is, like the outer conduits 27, of relatively heavy construction capable of containing the high pressure fluid. It will thus be seen that the arrangement of this invention requires that only one of the headers and only one set of the conduits be strong enough to withstand the full pressure of the compressed fluid. The total weight of the recuperator is thus reduced substantially from what would be required if both headers and both sets of conduits were subjected to the full pressure of the compressed fluid.

Thermal expansion and contraction of the elements of the heat exchange members 22 may also occur without creating thermal stresses. As best illustrated by FIG. 3, the cylinders 40 are secured to both the outer header 23 and the inner header 24, the cylinders 40 thus supporting the inner header. Thermal expansion or contraction of the cylinders 40 thus results in slight movement of the inner header 24 relative to the outer header. Since the slip joints 49 are provided in the conduits 25, no stresses are created by the movement of the inner header. The finned structures 45 and 47 permit free thermal expansion and contraction between the tubes 41 and the associated cylinders 40 and 46.

The total weight of the recuperator is also affected by its size. It will be noted that the recuperative arrangement illustrated by FIG. 1 directs all of the exhaust fluid and compressed air through the recuperator under all operating conditions. It is therefore a requirement that the recuperator be large enough to handle the maximum flow rates which occur when the powerplant is operating under full load conditions. At part power operation, the capacity and weight of the recuperator are greater than required at part power. This type of engine is most efficient when operating at full power. Some engines are, however, normally run at part power settings. It is therefore sometimes desirable to design the recuperator to provide most efficient operation at part power. A recuperative powerplant utilizing this invention for efficient part power operation is illustrated by FIG. 5.

In FIG. 5, a gas turbine powerplant 10' is illustrated, the powerplant 10' being substantially similar to the powerplant 10 of FIG. 1. The fluid handling elements comprising the recuperator are, however, sized to accommodate only a portion of the full load gas flow. The elements are thus substantially lighter than the counterpart elements of the powerplant shown by FIG. 1. During part power operation, all of the exhaust fluid is directed over the outer surfaces of the heat exchange members 22'. When the exhaust flow is greater than can be accommodated through the exhaust passageway 15', valve plates 60 are moved from the closed positions illustrated by solid lines in FIG. 5 to the open positions illustrated by broken lines. With the valve plates 60 in the open positions, the excess flow at high power settings can be bypassed around the recuperator and discharged through the nozzle 16'. This arrangement is thus most efficient at normal part power operation.

From the foregoing, it will be appreciated that the recuperative arrangement of this invention provides a relatively lightweight structure which is substantially free of thermal stresses. The arrangement also provides a structure having inherently low leakage.

It will be understood that the invention is not limited to the specific details of construction and arrangement of the embodiments illustrated and described herein since changes and modifications will be obvious to those skilled in the art. For example, the tubular conduits 25 and 27 may be replaced with complete annular ducts encircling the powerplant, one of the ducts being enveloped by the other. Similarly, although the illustrated embodiment is preferable, the headers 23 and 24 need not extend around the entire periphery of the powerplant. It is therefore intended to cover in the appended claims all such changes and modifications which may occur to those skilled in the art without departing from the true spirit and scope of the invention.

What is claimed as new and desired to secure by Letters Patent of the United States is:

1. In a gas turbine powerplant including a fluid compressor having inlet and discharge portions, a combustor having inlet and discharge portions, and a turbine having inlet and discharge portions in axially spaced relation, a discharge opening, and a passageway connecting the discharge portion of the turbine to the discharge opening, a recuperative arrangement comprising:
a first annular header,
first ducting means connected to said first annular header,
a second annular header enveloped by said first annular header in spaced relation thereto,
second ducting means connected to said second annular header,
said second ducting means enveloped by and coaxial with said first ducting means,
one of said first and second ducting means connected to the discharge portion of the compressor and the other of said first and second ducting means connected to the inlet portion of the combustor,
and a bank of heat exchange members positioned in the pasasgeway between the discharge portion of the turbine and the discharge opening in heat exchange relation with combustion products flowing therethrough,
each of said heat exchange members comprising an elongated closed cylinder slidably supported in the passageway and a coaxial tube slidably supported within said cylinder,
said elongated cylinder intersecting the wall of said first annular header and secured to said first and second annular headers adjacent first ends of said cylinder and said tube, said elongated cylinder supporting said second annular header within said first annular header,
the first end of said tube intersecting the wall of said second annular header and opening into the interior of said second annular header,
means defining a fluid passageway adjacent the first ends of said cylinder and said tube between the interior of said first annular header and the space between said cylinder and said tube,
means defining a fluid passageway adjacent the second ends of said cylinder and said tube between the interior of said tube and the space between said cylinder and said tube,
whereby fluid supplied to said heat exchange members from the compressor is heated by the combustion products prior to being delivered to the combustor.

2. A recuperative arrangement for a gas turbine powerplant as defined by claim 1 in which first and second expansion means are provided in said first and second ducting means, respectively, to accommodate expansion and thereby relieve stresses therein.

3. In a gas turbine powerplant including a fluid compressor having inlet and discharge portions, a combustor having inlet and discharge portions, and a turbine having inlet and discharge portions in axially spaced relation, a discharge opening, a first passageway connecting the turbine to the discharge opening, a second passageway connecting the turbine to the discharge nozzle, and a valve in the second passageway movable between open and closed positions, the entire flow of combustion products being directed through the first passageway when the valve is in its closed position, a recuperative arrangement comprising:
a first annular header,
a first set of tubular ducts connected to said first annular header,
a second annular header enveloped by said first annular header in spaced relation thereto,
a second set of tubular ducts connected to said second annular header,
each of said second set of ducts enveloped by and coaxial with a corresponding one of said first set of ducts,
one of said first and second sets of ducts connected to the discharge portion of the compressor and the other of said first and second sets of ducts connected to the inlet portion of the combustor,
and a bank of heat exchange members positioned in the first passageway between the discharge portion of the turbine and the discharge opening in heat exchange relation with combustion products flowing therethrough,
each of said heat exchange members comprising an elongated closed cylinder slidably supported in the first pasageway and a coaxial tube slidably supported therein,
said elongated cylinder intersecting the wall of said first annular header and secured to said first and second annular headers adjacent first ends of said cylinder and said tube, said elongated cylinder supporting said second annular header within said first annular header,
the first end of said tube intersecting the wall of said second annular header and opening into the interior of said second annular header,
means defining a fluid passageway adjacent the first ends of said cylinder and said tube between the interior of said first annular header and the space between said cylinder and said tube,
means defining a fluid passageway adjacent the second ends of said cylinder and said tube between the interior of said tube and the space between said cylinder and said tube,
whereby fluid supplied to said heat exchange members from said compressor is heated by the combustion products flowing through the first passageway prior to being delivered to said combustor.

4. A recuperative arrangement for a gas turbine powerplant as defined by claim 3 in which first and second expansion means are provided in said first and second ducting means, respectively, to accommodate expansion and thereby relieve stresses therein.

5. In a gas turbine powerplant including a fluid compressor having inlet and discharge portions, a combustor having inlet and discharge portions, and a turbine having inlet and discharge portions in axially spaced relation, a discharge opening, and a passageway connecting the discharge portion of the turbine to the discharge opening, a recuperative arrangement comprising:
a first annular header,
a second annular header enveloped by said first annular header in spaced relation thereto,
a heat exchanger connecting said first and second annular headers in fluid flow relation,
said heat exchanger positioned in the passageway between the discharge portion of the turbine and the discharge opening in heat exchange relation with combustion products flowing therethrough,
first ducting means connected to said first annular header,
and second ducting means connected to said second annular header,
said second ducting means enveloped by and coaxial with said first ducting means,
one of said first and second ducting means connected to the discharge portion of the compressor for supplying compressor discharge fluid to said heat exchanger and the other of said first and second ducting means connected to the inlet portion of the combustor for supplying the heated compressor discharge fluid to the combustor from said heat exchanger, the pressure of compressor discharge fluid in said first and second ducting means, said first and second headers, and said heat exchanger being substantially uniform such that said second header and said second ducting means are subjected to substantially balanced internal and external pressure during powerplant operation, the relatively small pressure gradients existing across said second header and said second ducting means during powerplant operation permitting the use of relatively lightweight and low-strength materials in the fabrication of said members.

6. In a gas turbine powerplant including a fluid compressor having inlet and discharge portions, a combustor having inlet and discharge portions, and a turbine having inlet and discharge portions in axially spaced relation, a discharge opening, and a passageway connecting the discharge portion of the turbine to the discharge opening, a recuperative arrangement comprising:

a first annular header, a second annular header enveloped by said first annular header in spaced relation thereto, a bank of composite, expansible heat exchange members connecting said first and second annular headers in fluid flow relation, said bank of composite heat exchange members positioned in the passageway between the discharge portion of the turbine and the discharge opening in heat exchange relation with combustion products flowing therethrough, first ducting means connected to said first annular header, and second ducting means connected to said second annular header, said second ducting means enveloped by and coaxial with said first ducting means, one of said first and second ducting means connected to the discharge portion of the compressor for supplying compressor discharge fluid to said heat exchange members and the other of said first and second ducting means connected to the inlet portion of the combustor for supplying the heated compressor discharge fluid to the combustor from said heat exchange members, the pressure of compressor discharge fluid in said first and second ducting means, said first and second headers, and said heat exchange members being substantially uniform such that said second header and said second ducting means are subjected to substantially balanced internal and external pressure during powerplant operation, the relatively small pressure gradients existing across said second header and said second ducting means during powerplant operation permitting the use of relatively lightweight and low-strength materials in the fabrication of said members.

References Cited by the Examiner

UNITED STATES PATENTS

| | | | |
|---|---|---|---|
| 1,495,066 | 5/24 | Browne | 165—81 |
| 1,868,661 | 7/32 | Heimberger | 165—82 |
| 2,499,608 | 3/50 | Rink | 165—142 |
| 2,587,057 | 2/52 | McVeigh | 60—39.51 |
| 2,633,338 | 3/53 | Hiersch | 165—143 |
| 2,713,245 | 7/55 | Weaving | 60—39.51 |
| 2,937,855 | 5/60 | Hazen | 165—142 |

FOREIGN PATENTS 604,114  6/48  Great Britain.

SAMUEL LEVINE, *Primary Examiner*.